May 22, 1934.　　G. T. SHOOSMITH　　1,959,389
ADSORPTION SYSTEM
Filed July 2, 1931　　2 Sheets-Sheet 2
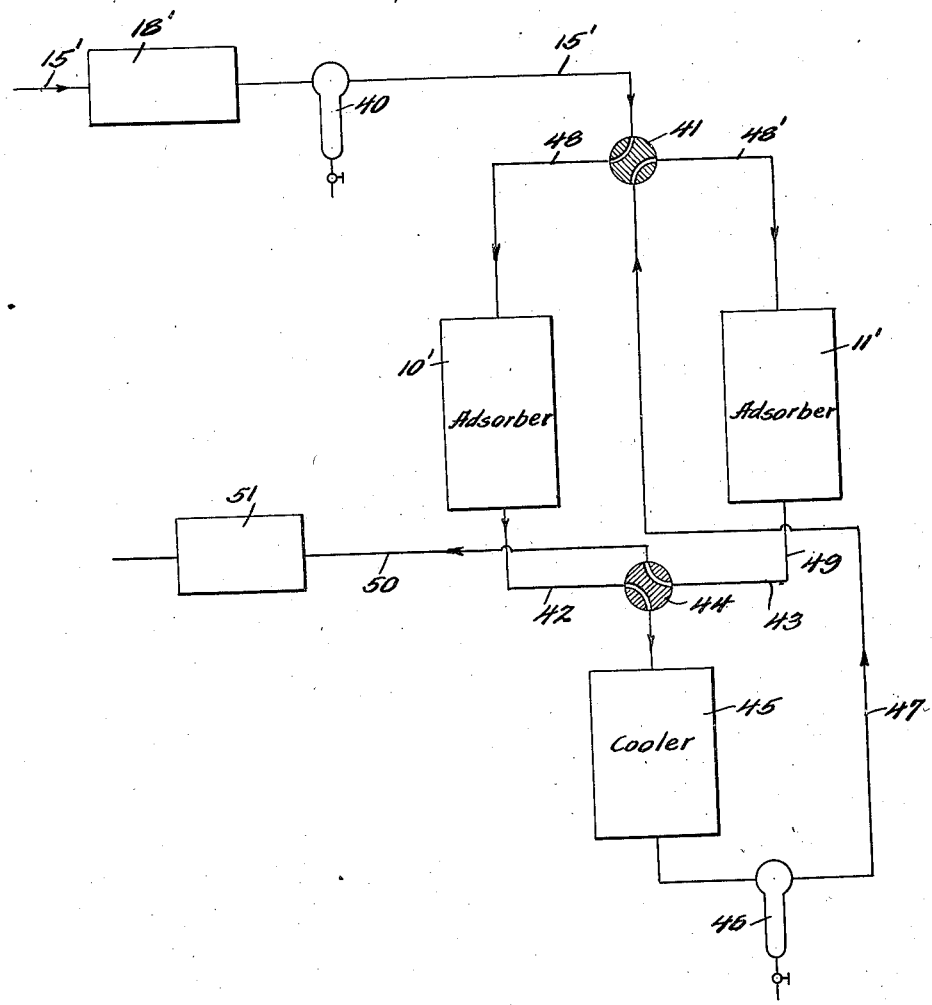

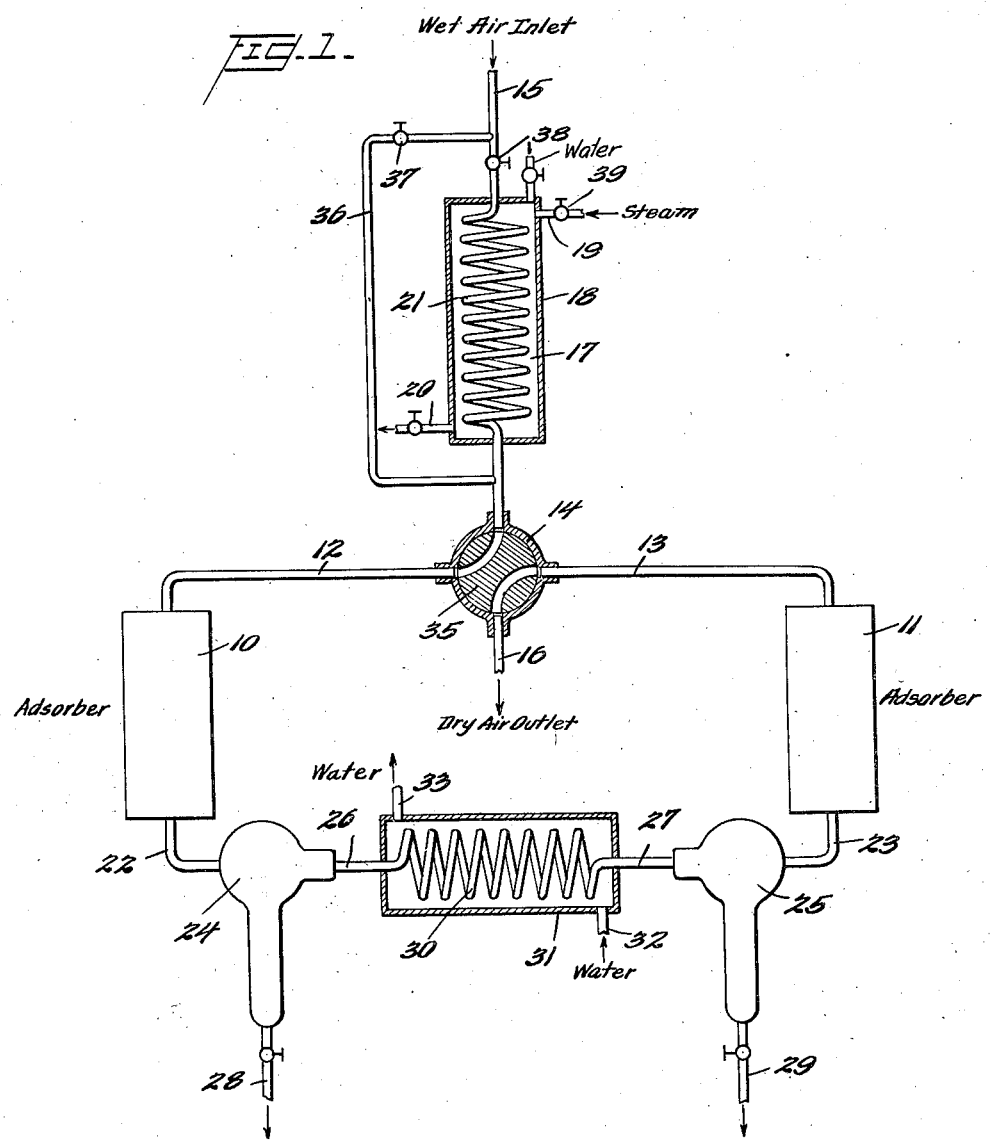

Patented May 22, 1934

1,959,389

UNITED STATES PATENT OFFICE 1,959,389

ADSORPTION SYSTEM

Guy T. Shoosmith, Baltimore, Md., assignor, by mesne assignments, to Chester F. Hockley, receiver for The Silica Gel Corporation, Baltimore, Md., a corporation of Maryland Application July 2, 1931, Serial No. 548,466

2 Claims. (Cl. 183—4)

This invention relates to adsorption systems and apparatus, and more particularly to such systems for use in removing and/or recovering condensible gases or vapors from gaseous mixtures.

It is a general object of the present invention to provide novel and improved adsorption systems and apparatus.

More particularly it is an object of the invention to provide adsorption systems and apparatus wherein the number of parts are reduced to a minimum and wherein the transfer of adsorbers from adsorption to activation is effected with utmost simplicity.

An important feature of the present invention resides in the provision of apparatus for use in an adsorption system wherein a gaseous mixture, from which a condensible constituent is to be removed, is first used for activating an adsorber which is partially saturated with that constituent, and is then passed through a second adsorber to have the condensible constituent removed, and in which the adsorbers are periodically reversed in their position in the gas circuit.

Another important feature of the invention resides in the provision of such connecting piping and valves for the adsorbers and accessories that the direction of flow of the gaseous mixture through the adsorbers is always the same irrespective of their position in the circuit.

Other and further features and objects of the invention will be apparent to those skilled in the art upon a consideration of the accompanying drawings and following specification, wherein are disclosed two exemplary embodiments of the invention, with the understanding, however, that such changes, variations, and combinations may be made therein as fall within the scope of the appended claims, without departing from the spirit of the invention.

In said drawings:

Figure 1 is a partially diagrammatic layout of apparatus and piping necessary for carrying out the system of the present invention in its simplest form; and Figure 2 is a schematic showing in diagrammatic form of apparatus for carrying out the method of the present invention with uniflow through the adsorbers.

In a great many commercial processes it is desirable to be able to separate, or separate and recover, condensible constituents from gaseous mixtures. As examples of such systems for treating gaseous mixtures may be mentioned the dehydration of compressed air, the dehydration of various gases, and particularly those which are to be liquefied or solidified, the dehydration of atmospheric air, and the recovery of volatile solvents from various chemical processes.

For the sake of convenience, the present invention has been disclosed in connection with the dehydration of compressed air, the advantages of which are so obvious as to require no detailed explanation herein. It will be understood, however, that the invention is not at all limited to this particular use, but is intended to be broadly used for the removing of a "condensible" constituent from any mixture of gases or gases and vapors. The word "condensible" is used to designate broadly any constituent of a gaseous mixture which will condense at higher temperatures than the remaining constituents under the respective partial pressures existing at the system inlet and which can be removed by adsorption and condensed by cooling.

The preferred material for use in abstracting moisture from compressed air is an adsorbent of the type which can be activated for re-use by heating to disturb the vapor pressure equilibrium within and without the pores of the adsorbent. As an example may be mentioned the hard, porous gels, of which silica gel is probably the best known. This material is available in granular form for arrangement in beds through which the air to be treated can be passed in a well-known manner.

In accordance with the present invention, and with particular reference to Fig. 1, for continuous operation at least two adsorbers 10 and 11 of any preferred construction are used, one of which is always on the adsorption phase and the other on the activating or subsequent cooling phase. One port of each of these two adsorbers is connected respectively, by pipes 12 and 13, to the two-way, four-port valve 14, which selectively connects either one of them with the inlet pipe 15 for wet compressed air and connects the other with the discharge pipe 16 for the dried compressed air.

Interposed in the inlet pipe 15 and ahead of the valve 14 is the heater 17, which may comprise a closed casing 18 having a steam inlet pipe 19 and a condensate drain 20 and through which the pipe 15 passes in the form of a helix 21. The air passing through this coil 21 may thus be heated indirectly by steam entering the jacket through the pipe 19. The steam is permitted to condense in the jacket and the condensate is drawn off through the drain 20 in any well-known manner.

Each adsorber has also a second pipe communicating with its casing, and respectively indicated by the reference characters 22 and 23, and each of these pipes is connected to a separate drain device 24, 25, which may be in the form of suitable traps, permitting the flow of air therethrough but collecting entrained particles of moisture which can be drawn off as desired, either automatically or manually. These traps are shown as having the air outlets 26 and 27 respectively, and at their bottoms the moisture drains 28 and 29 respectively, controlled by the valves as shown. Such traps are available on the open market and need not be further described herein.

Connected between the outlets 26, 27 of the traps is the pipe coil or helix 30 immersed in the tank 31 to which cold water can be delivered through the pipe 32 entering at the bottom and from which heated water is wasted through the upper pipe 33.

Having described the apparatus, it will be clear how the system operates. Compressed air under any desired pressure enters the pipe 15 and in passing through the coil 21 has its temperature very materially raised by the addition of heat from the steam in the jacket 18. In the event that the entering air carries its maximum amount of moisture and is thus saturated, or in any other event, its relative humidity will be materially lowered by raising its temperature, and with the proper setting of the valve plug 35, as shown, the air will pass through the pipe 12 to the left hand adsorber which is assumed to contain partially saturated adsorbent from a prior drying cycle. In passing through this adsorber the heated air will take up the moisture in the adsorbent until the air approaches saturation. This is in accordance with the well-known desorption principle of adsorbents, wherein the sensible heat of the air is changed to latent heat and heat of wetting to vaporize the condensed water vapor.

The moisture released from the adsorbent and which raises the absolute humidity of the air, is carried along with the air in the form of a true vapor, and hence is not affected by the trap 24. However, when it reaches the coil 30, where the air is cooled very materially by the cooling water flowing in the jacket 31, the air temperature is so reduced by removing sensible heat that it falls below the dewpoint and upon removal of the latent heat by transfer to the water, the condensible vapor is reduced to a liquid disposed in the form of a fog and is blown along with the air into the trap 25 which removes it in accordance with its principle of operation, leaving the air saturated at its dry bulb temperature at which it emerges from the trap.

The air then passes into the active adsorber 11, where the adsorbent is assumed to have been previously dried or activated, so that the remaining moisture therein, or such portion thereof as will be taken up by the adsorbent, is adsorbed by the adsorbent, changing latent and heat of wetting to sensible heat, and the dried air is discharged through the pipe 13 to the discharge pipe 16 through the proper passage in the valve 14.

This operation may be continued until the adsorbent in the adsorber 11 is substantially saturated, when a reversal of the valve will cause the heated air to flow into the adsorber 11 to activate it and then to eventually pass to the adsorber 10 which now is activated from the previous cycle, so that the air will be dried therein and discharged through the pipe 12, valve plug 35 and pipe 16. In this cycle the trap 24 will be effective in removing the moisture, and the trap 25 merely forms a part of the air conduit.

In the event that it is desired to cool an adsorber after it has been activated and before it again starts to adsorb, in order to improve its adsorption qualities, this may be done by several methods, for instance, by bypassing the heater as through the pipe 36, by opening the valve 37 and closing the valve 38, or by shutting off the steam entering the pipe 19 by closing the valve 39. This elimination of heating can be done for a period during the latter part of the cycle between flow shifts, if conditions are such that it does not take as long to activate the adsorber as an adsorber will stay on the adsorption phase and remain efficient.

It will be obvious that if gas and vapor mixtures are available at elevated temperatures for treatment, as for instance, air directly from air compressors, or the hot vapor laden air from drying ovens for solvent recovery, the heater 17 may be reduced in size, omitted, or bypassed as previously described.

The invention provides extremely simple apparatus and a single control valve which need be moved but 90° to reverse the effective positions of the adsorbers in the circuit. A step by step advance of 90° can readily be effected automatically at definite periods by extremely simple apparatus, as will be obvious.

The most desirable form of adsorber is one in which the adsorbent material, such as silica gel, is arranged in horizontal beds supported on screens or reticulated metal spacers, and in which a plurality of these beds are arranged vertically above one another in a suitable casing. Where low gas velocities are desirable, the direction of flow can be either up or down, but above a certain optimum flow rate, the flow is most satisfactory in a downward direction, for if attempt is made to exceed certain critical velocities with upward flow, the particles of adsorbent will be agitated to such an extent that certain portions of the gas will pass through without satisfactory contact and the agitation may cause decrepitation of the adsorbent. Therefore it is highly desirable, where velocities above the critical velocity are needed to increase the plant capacity without increasing its size, to insure that downward flow exists at all times.

In Fig. 1 it will be seen that downward flow is effected in the activating adsorber and upward flow in the adsorbing adsorber, but this difficulty can be overcome by resorting to apparatus arranged in accordance with Fig. 2. In this construction two adsorbers 10', 11' are used as in the form shown in Fig. 1, and there is also a heater 18' connected in the inlet pipe 15' for the gaseous mixture.

The heater 18' may be bypassed by an arrangement such as shown in Fig. 1. It is also desirable to arrange this heater so that it can at times be used as a cooler. This can be arranged by providing means for shutting off steam to the jacket and substituting cold water therefor. At the end of an activation period, if a hot adsorber bed is put on the adsorption phase, its efficiency of removal is low until the adsorbent has cooled, so that momentarily at every shift a quantity of comparatively wet gas leaves the adsorber unit. However, if the adsorber bed is cooled prior to the shift this wet gas period is eliminated and such cooling can be effected by temporarily changing the heater 18' to a cooler as above described or providing a separate cooler in parallel thereto.

When 18' is acting as a cooler, the dew point of the gaseous mixture leaving the cooler may be lower than the dew point of the mixture entering the cooler, so that a certain quantity of the condensible is freed and must be caught, for instance as in the trap 40, to prevent it from entering the adsorber which is being cooled.

The gaseous mixture to be treated is delivered to one adsorber or the other, in accordance with the setting of the two-way, four-way port valve 41, and in the position shown, it is arranged to deliver the mixture through the pipe 48 to the adsorber 10'. On leaving the activating adsorber, the mixture passes through the pipe 42, or the pipe 43, to a second two-way four-port valve 44 which discharges the enriched mixture from the activating adsorber into the cooler 45, which corresponds to the cooler in the modification of Fig. 1, and in here the temperature is reduced so that the mixture tends to become supersaturated and condensible is liquefied and subsequently removed in the trap 46, which is constructed the same as either of the traps described in connection with Fig. 1.

The discharge pipe 47 from the trap 46 leads to the valve 41, which is so constructed that the partially denuded vapor must be delivered to the adsorber which is not receiving the incoming mixture to be treated. In the present instance the cooled vapor will be delivered through the pipe 48' to the adsorber 11', flowing therethrough in a downward direction and corresponding to the direction of flow in the adsorber 10'.

The discharge from the adsorber 11' is through the pipe 49 to the valve 44, the second passage through which delivers the discharging and substantially stripped gas to the outlet pipe 50, which may have interposed therein the aftercooler 51, if it is desired to remove from this stripped gas the heat of adsorption.

Upon a reversal of the two valves 41, 44, it will be seen that the flow will be first through the pipe 48' into the adsorber 11', the pipe 43, the valve 44, then the cooler 45, the trap 46, the pipe 47, valve 41, the pipe 48, and then the adsorber 10'. In this case the flow will also be downwardly through both adsorbers, effecting, therefore, a condition of uniflow in both adsorbers in accordance with the best practice.

It will be obvious that where it is undesirable to have heated and cooled gases both flowing through the same valve, that the two-way, four-port valves can readily be changed into two two-way, three-port valves by the addition of a small extra amount of piping. The only place where the heat transfer resulting from the two temperatures flowing in the same valve might be serious, would be in the valve 41, where the very hot incoming gases would give up some of their heat to the gases just leaving the cooler 45.

Having thus described the invention, what is claimed as new and desired to be secured by Letters Patent is:

1. Apparatus for removing condensible from a gaseous mixture comprising, in combination, a mixture inlet pipe, a stripped gas delivery pipe, a pair of adsorbers each having two ports, a four way valve selectively connecting one port of each adsorber to one of said pipes, a cooler, a pair of condensate traps and means connecting a trap between the remaining port of each adsorber and the cooler.

2. Apparatus for removing condensible from a gaseous mixture comprising in combination, a heater for the mixture, an adsorber containing a partially saturated porous adsorbent, a condensate separator, a mixture cooler, a second condensate separator, a second adsorber containing active porous adsorbent, piping connecting said elements in the order named, and means to temporarily change the heater to a cooler.

GUY T. SHOOSMITH.